US011970893B2

(12) United States Patent
Holzapfel et al.

(10) Patent No.: US 11,970,893 B2
(45) Date of Patent: Apr. 30, 2024

(54) FURNITURE FITTING

(71) Applicant: Julius Blum GmbH, Hoechst (AT)

(72) Inventors: Andreas Holzapfel, Bregenz (AT); Philip Schluge, Dornbirn (AT)

(73) Assignee: Julius Blum GmbH, Hoechst (AT)

( * ) Notice: Subject to any disclaimer, the term of this patent is extended or adjusted under 35 U.S.C. 154(b) by 288 days.

(21) Appl. No.: 17/523,435

(22) Filed: Nov. 10, 2021

(65) Prior Publication Data

US 2022/0065011 A1 Mar. 3, 2022

Related U.S. Application Data

(63) Continuation of application No. PCT/AT2020/060150, filed on Apr. 15, 2020.

(30) Foreign Application Priority Data

May 17, 2019 (AT) .............................. A 50449/2019

(51) Int. Cl.
*E05D 3/14* (2006.01)
*E05D 15/32* (2006.01)
(Continued)

(52) U.S. Cl.
CPC ............. *E05D 3/142* (2013.01); *E05D 15/32* (2013.01); *E05D 15/463* (2013.01); *E06B 3/443* (2013.01); *E05Y 2900/212* (2013.01)

(58) Field of Classification Search
CPC ....... E05D 3/142; E05D 15/32; E05D 15/463; E05D 15/40; E05D 15/401; E05D 15/403;
(Continued)

(56) References Cited

U.S. PATENT DOCUMENTS 7,628,443 B2 12/2009 Krajenke
8,894,162 B2 11/2014 Kashiwaguma
(Continued)

FOREIGN PATENT DOCUMENTS

AT 506519 A1 * 9/2009 ........... E05D 15/262
AT 515661 A4 * 11/2015 ............. E05D 15/40
(Continued)

OTHER PUBLICATIONS

International Search Report dated Jun. 24, 2020 in International (PCT) Application No. PCT/AT2020/060150.

*Primary Examiner* — Hanh V Tran

(74) *Attorney, Agent, or Firm* — Wenderoth, Lind & Ponack, L.L.P.

(57) ABSTRACT

A furniture fitting for moving a movable furniture part relative to a furniture carcass includes a housing to be connected to the furniture carcass, and an actuating mechanism arranged or can be arranged at least in part within the housing. The actuating mechanism can be connected to the movable furniture part, and the actuating mechanism can swivel about at least one rotation axis. The actuating mechanism and/or at least one inner side of the housing facing the actuating mechanism has a local elevation, by which, at least in a relative position of the actuating mechanism to the housing, a play between the actuating mechanism and the inner side of the housing facing the actuating mechanism is at least halved in comparison to a region surrounding the local elevation.

21 Claims, 5 Drawing Sheets

(51) Int. Cl.
*E05D 15/46* (2006.01)
*E06B 3/44* (2006.01)

(58) Field of Classification Search
CPC ..... E05D 15/46; E06B 3/443; E05Y 2201/10; E05Y 2600/41; E05Y 2600/452; E05Y 2800/298; E05Y 2800/33; E05Y 2800/34; E05Y 2800/406; E05Y 2800/465; E05Y 2800/682; E05Y 2900/20; E05F 1/1058; E05F 1/1075
See application file for complete search history.

(56) References Cited

U.S. PATENT DOCUMENTS

| | | | | |
|---|---|---|---|---|
| 9,353,562 | B2 | 5/2016 | Oshima et al. | |
| 10,246,915 | B2 | 4/2019 | Brunnmayr | |
| 10,501,971 | B2 | 12/2019 | Zhang et al. | |
| 10,662,690 | B2 | 5/2020 | Schluge | |
| 10,927,577 | B2 * | 2/2021 | Kruedener | E05D 5/0276 |
| 11,248,406 | B2 * | 2/2022 | Nordieker | E05F 5/02 |
| 11,566,460 | B2 * | 1/2023 | Rheaume | E05D 15/463 |
| 11,603,687 | B2 * | 3/2023 | Giovannetti | E05D 3/18 |
| 11,725,444 | B2 * | 8/2023 | Bohle | E05F 3/00 16/64 |
| 2009/0015034 | A1 | 1/2009 | Krajenke | |
| 2012/0000130 | A1 * | 1/2012 | Kashiwaguma | E05F 1/1058 49/348 |
| 2015/0240546 | A1 * | 8/2015 | Oshima | E05F 1/14 16/80 |
| 2017/0328103 | A1 * | 11/2017 | Brunnmayr | E05D 3/14 |
| 2018/0209190 | A1 | 7/2018 | Zhang et al. | |
| 2018/0298661 | A1 | 10/2018 | Salice | |
| 2018/0363348 | A1 | 12/2018 | Schluge | |
| 2019/0316395 | A1 * | 10/2019 | Kruedener | E05D 3/16 |
| 2021/0212466 | A1 * | 7/2021 | Andschus | A47B 96/205 |
| 2022/0056747 | A1 * | 2/2022 | Holzapfel | E05F 3/22 |

FOREIGN PATENT DOCUMENTS

| | | | | |
|---|---|---|---|---|
| CA | 3058692 A1 * | 10/2018 | E05D 3/16 |
| CN | 101343968 | 1/2009 | |
| CN | 104583518 | 4/2015 | |
| CN | 105089400 | 11/2015 | |
| DE | 202012009218 U1 * | 3/2013 | E05D 3/16 |
| EP | 2 924 215 | 9/2015 | |
| EP | 3 401 478 | 11/2018 | |
| EP | 3 401 479 | 11/2018 | |
| JP | 2019-506551 | 3/2019 | |
| WO | 2010/097996 | 9/2010 | |
| WO | 2014/050749 | 4/2014 | |
| WO | 2016/127190 | 8/2016 | |
| WO | WO-2017143377 A1 * | 8/2017 | E05D 15/401 |
| WO | WO-2018107189 A1 * | 6/2018 | A47B 88/956 |
| WO | WO-2018116084 A1 * | 6/2018 | B64D 11/003 |
| WO | WO-2018192819 A1 * | 10/2018 | E05D 3/16 |
| WO | 2019/091969 | 5/2019 | |

* cited by examiner

FURNITURE FITTING

BACKGROUND OF THE INVENTION

The invention concerns a furniture fitting for moving a moveable furniture part relative to a furniture carcass comprising a housing which can be connected to the furniture carcass and an actuating mechanism which is or can be arranged at least partially within the housing and which can be connected to the moveable furniture part, wherein the actuating mechanism is pivotable about at least one axis of rotation. The invention further concerns an article of furniture comprising a furniture carcass and at least one furniture part mounted moveably to the furniture carcass by way of at least one such furniture fitting. And finally the invention concerns a method of load-dependent stabilization of a furniture part mounted moveably to a furniture carcass by way of at least one such furniture fitting.

Furniture fittings are already known from the state of the art. In that case, the furniture fittings are becoming thinner and thinner, with the aim of taking up as little storage space as possible for the furniture fittings. In the ideal case the furniture fittings are entirely or at least partially integrated into the furniture carcass so that no storage space at all is lost due to the furniture fittings. A further aim is to make the appearance of an article of furniture constructed with the furniture fittings as attractive as possible, which can also be achieved by thin furniture fittings.

A problem which arises with very thin furniture fittings, however, is that the stability of the furniture fittings is reduced, whereby that can give the impression that a furniture part held by the furniture fittings is too loose and is thus inadequately fixed in place, for example when the furniture part is subjected to transverse forces in an opened state.

SUMMARY OF THE INVENTION

The object of the present invention is to provide a furniture fitting which is improved over the state of the art and with which the described problems are at least partially overcome and which is distinguished in particular in that a furniture part connected to the furniture fitting is held in a stable condition by the furniture fitting, more specifically even when the furniture fitting is very thin, for example to integrate it into a side wall of a furniture carcass. In addition, the invention seeks to provide an article of furniture comprising at least one such improved furniture fitting and a method of load-dependent stabilization of a furniture part mounted moveably to a furniture carcass by way of at least one such improved furniture fitting.

In the case of the furniture fitting according to the invention, the actuating mechanism and/or at least one inner side of the housing that faces towards the actuating mechanism has at least one local raised portion, by which, at least in a relative position of the actuating mechanism with respect to the housing a clearance between the actuating mechanism and the at least one inner side of the housing, that faces towards the actuating mechanism, is at least halved (i.e., no more than half) in a direction parallel to the at least one axis of rotation in comparison with a region surrounding the at least one local raised portion.

If the actuating mechanism or a furniture part connected thereto is loaded in the at least one relative position by a force acting at least in the direction parallel to the at least one axis of rotation, then the actuating mechanism can move only slightly in that direction until the clearance is taken up, and contact is made at the at least one local raised portion between the actuating mechanism and the at least one inner side of the housing, that faces towards the actuating mechanism.

In comparison therewith, that is to say without the at least one local raised portion, the actuating mechanism or the furniture part connected thereto in the state of the art is moveable over a distance which is at least twice as great, thus giving the impression that the actuating mechanism is substandard and the furniture part is only inadequately held by the actuating mechanism. Those disadvantages are significantly reduced by the solution according to the invention with the at least one local raised portion.

According to an advantageous embodiment, a clearance between the actuating mechanism and the at least one inner side of the housing, that faces towards the actuating mechanism, is at least halved (not more than half) in a direction parallel to the at least one axis of rotation in comparison with a region surrounding the at least one local raised portion by the at least one local raised portion at least in a relative position of the actuating mechanism with respect to the housing, that corresponds to a complete open position of the furniture part which can be connected to the actuating mechanism. It is precisely in the completely open position that the described disadvantages become particularly clearly manifest as it is here that the effective lever lengths which convert any transverse forces into a movement of the actuating mechanism are particularly great. It is therefore particularly advantageous that the at least one relative position is that open position.

It has proven to be advantageous if a clearance between the actuating mechanism and the at least one inner side of the housing that faces towards the actuating mechanism is at least halved (no more than half) in a direction parallel to the at least one axis of rotation in comparison with a region surrounding the at least one local raised portion by the at least one local raised portion in any relative position of the actuating mechanism with respect to the housing The stability of the furniture fitting can be further enhanced thereby.

It has proven to be advantageous if the clearance between the actuating mechanism and the at least one inner side of the housing, that faces towards the actuating mechanism, is reduced at least to a fifth at the at least one local raised portion in the direction parallel to the at least one axis of rotation in comparison with the region surrounding the at least one local raised portion. In that way, on the one hand, even when there are manufacturing tolerances it is possible to ensure that the actuating mechanism in a non-loaded normal mode of operation upon a movement relative to the housing does not come into rubbing contact with the housing while on the other hand, already in the event of slight transverse forces secure support for same occurs.

Alternatively or additionally thereto, the clearance between the actuating mechanism and the at least one inner side of the housing that faces towards the actuating mechanism is 0.05 mm to 0.20 mm at the at least one local raised portion in the direction parallel to the at least one axis of rotation, and/or the clearance between the actuating mechanism and the at least one inner side of the housing that faces towards the actuating mechanism is 0.80 mm to 2.00 mm in the direction parallel to the at least one axis of rotation in the region surrounding the at least one local raised portion.

An advantageous embodiment provides that the actuating mechanism includes at least one articulated lever at which the at least one local raised portion is arranged. Preferably, the at least one articulated lever has a first end moveable out of the housing and a second end which is opposite to the first end and which is arranged within the housing at least in the at least one relative position of the actuating mechanism. The at least one local raised portion is arranged at the second end of the at least one articulated lever. That makes it possible to utilize a highly advantageous lever ratio for stabilization of the furniture fitting.

In this connection, it has been found to be advantageous if the at least one articulated lever is connected to at least one further articulated lever by way of at least one joint axis, preferably wherein the at least one local raised portion is arranged at a prolongation of the at least one articulated lever, that extends beyond the at least one joint axis. An increased amount of material required for providing the at least one articulated lever is therefore intentionally accepted to permit efficient stabilization of the furniture fitting.

Advantageously, the at least one local raised portion is in the form of an outwardly shaped portion and/or in the form of an additional part, preferably of plastic. The use of plastic has the advantage that substantially no noise is created when contact is made between the actuating mechanism and the at least one inner side of the housing.

Alternatively or additionally, the at least one local raised portion is arranged in the form of a curved outwardly shaped portion at the at least one inner side of the housing, that faces towards the actuating mechanism. The curved shape of the outwardly shaped portion makes it possible to implement reliable stabilization along a curved path in the course of a movement of the actuating mechanism over a greater angular range relative to the housing.

It has proven to be desirable if the housing has at least a first side and a second side opposite the first side. The two sides of the housing are spaced from each other in a direction parallel to the at least one axis of rotation, and preferably at least one first local raised portion is arranged in the region of the first side of the housing and at least one second local raised portion is arranged in the region of the second side of the housing.

Basically, however, it is also sufficient if only at least one local raised portion is used for stabilization of the furniture fitting, in particular when two of the furniture fittings are used to mount a furniture part moveably to a furniture carcass. A first sample is arranged on a first inner side of the furniture carcass, and a second unit of the furniture fitting is arranged on a second inner side of the furniture carcass, that is opposite to the first inner side. Depending on the respective direction of the transverse forces to be carried, the mirror-symmetrical installation on the furniture carcass provides that either the local raised portion of the first sample or the local raised portion of the second sample of the furniture fittings is used.

The housing of the furniture fitting can substantially be of a cuboidal configuration.

To compensate for a weight force acting on the actuating mechanism or a furniture part connected thereto and/or for supporting the movement of the actuating mechanism or a furniture part connected thereto into a given relative position, for example the closed position and/or the completely open position, the actuating mechanism includes at least one spring force storage mechanism for applying force to the at least one furniture part which can be connected to the actuating mechanism. Preferably, there is at least one adjusting device for adjusting a spring prestressing of the at least one spring force storage mechanism, which adjusting device is particularly preferably actuable from an end of the housing of the furniture fitting.

According to preferred embodiments, the actuating mechanism is in the form of a 7-rotary joint mechanism and/or is rotatably connected to the housing by way of at least one axis which is fixed with respect to the housing, wherein all provided axes which are fixed with respect to the housing are formed separately from the at least one local raised portion.

It is appropriate if there is at least one fixing device actuable preferably from an end of the housing of the furniture fitting for fixing the housing of the furniture fitting in a recess of the furniture carcass. In that way, the furniture fitting can be efficiently and securely fixed in the recess. In addition, it is possible to ensure that the furniture fitting is fitted in the prescribed manner.

As stated in the opening part of this specification, an article of furniture comprises a furniture carcass and at least one furniture part mounted moveably to the furniture carcass by way of at least one furniture fitting according to the invention. Preferably, the furniture part is in the form of a furniture door or furniture flap and/or is pivotable about a substantially horizontal axis of rotation.

According to an advantageous embodiment, the furniture carcass includes at least one side wall, and at least one recess is arranged in the at least one side wall and the housing of the furniture fitting is arranged at least region-wise, preferably completely, in the at least one recess. Preferably, the at least one recess and/or the housing is of a substantially cuboidal configuration, and the housing is covered at at least four and preferably five sides by a material of the at least one side wall. It is possible in that way to realize a particularly advantageous aesthetic appearance.

And finally, protection is claimed for a method of load-dependent stabilization of a furniture part mounted moveably to a furniture carcass by way of at least one furniture fitting according to the invention. In a non-loaded state in which substantially only a weight force and a spring force of an optionally provided spring force storage mechanism acts on the furniture part, at the at least one local raised portion there is a clearance between the actuating mechanism and the at least one inner side of the housing, that faces towards the actuating mechanism, in a direction parallel to the at least one axis of rotation of the actuating mechanism, and that clearance in a state in which the moveable furniture part is loaded by an additional force acting at least in the direction parallel to the at least one axis of rotation is reduced to zero so that contact occurs between the actuating mechanism and the at least one inner side of the housing, that faces towards the actuating mechanism, at least at the at least one local raised portion.

BRIEF DESCRIPTION OF THE DRAWINGS

Further details and advantages of the invention are described more fully hereinafter by means of the description of figures with reference to the drawings in which:

FIG. 2*a* shows the furniture fitting in a diagrammatic side view in which a housing cover is left out, partial FIG. 2*b* is a diagrammatic cross-sectional view along cross-sectional plane 51, and partial FIG. 2*c* shows an articulated lever of the furniture fitting in a diagrammatically illustrated perspective view, FIG. 4*a* shows the furniture fitting in a diagrammatic side view in which a housing cover is left out, partial FIG. 4*b* shows a diagrammatic cross-sectional view along cross-sectional plane 51 and partial FIG. 4*c* shows an articulated lever of the furniture fitting in a diagrammatically illustrated perspective view.

DETAILED DESCRIPTION OF THE INVENTION

Figure 1A:
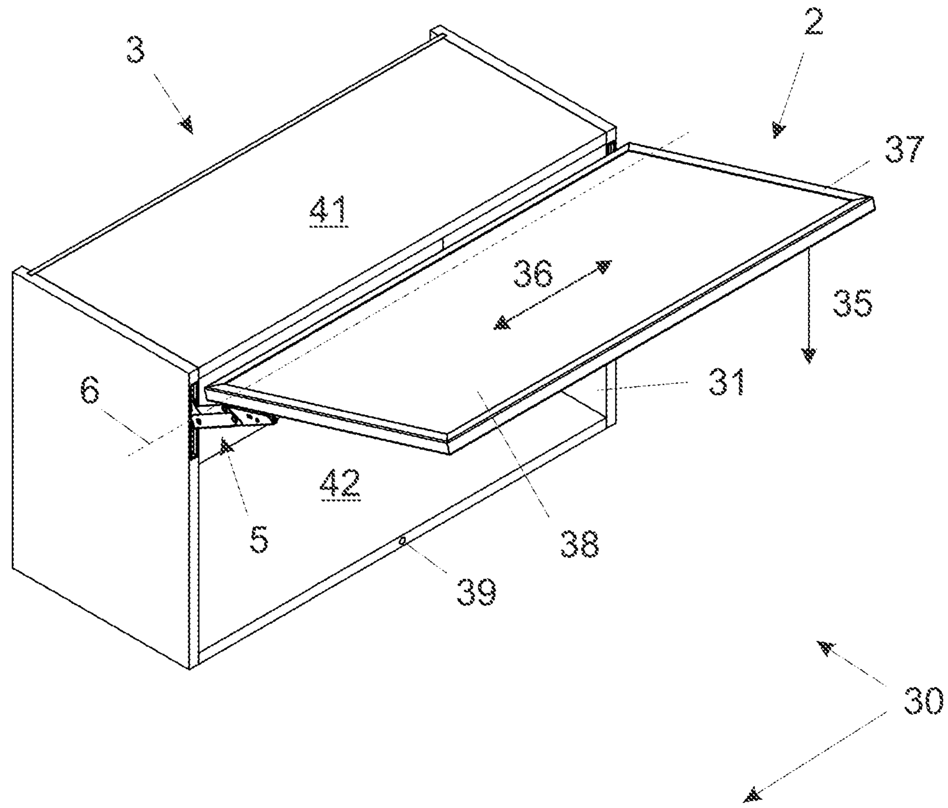
FIGS. 1*a* and 1*b* are diagrammatically illustrated perspective views of an article of furniture according to a preferred embodiment, wherein partial FIG. b) shows the article of furniture in a partially dismantled state.
Figure 1B:
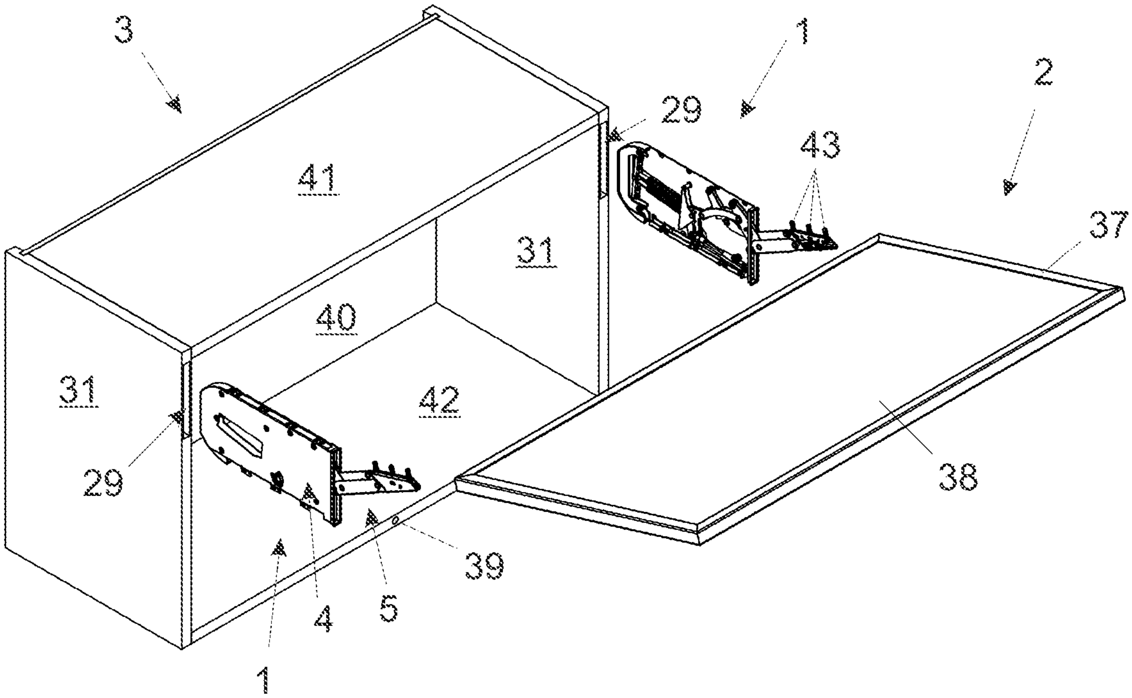

FIGS. 1*a* and 1*b* show an article of furniture 30 comprising a furniture carcass 3 and a furniture part 2 mounted moveably to the furniture carcass 3 by way of furniture fittings 1, wherein in the illustrated case the furniture part 2 is in the form of a furniture flap and is pivotable about a substantially horizontal axis of rotation 6.

The furniture carcass 3 comprises side walls 31, wherein a respective recess 29 is arranged in the side walls 31 and a respective housing 4 of the furniture fittings 1 is arranged at least region-wise or, as in the illustrated case even completely, in the recesses 29.

The recesses 29 and the housings 4 substantially are of a cuboidal configuration and the housings 4 are covered at at least four, preferably five, sides 22, 23, 32, 33, 34 by a material of the at least one side wall 31.

The furniture part 2 can have a frame 37 which holds a glass insert 38.

The article of furniture 30 can further have an ejection device 39 with which the furniture part 2 can be ejected from a closed position into a partly open position in which it is possible to get behind the furniture part 2 for a user.

The furniture carcass 3, besides the side walls 31, can have a rear wall 40, a top 41 and a bottom 42.

Figure 2A:
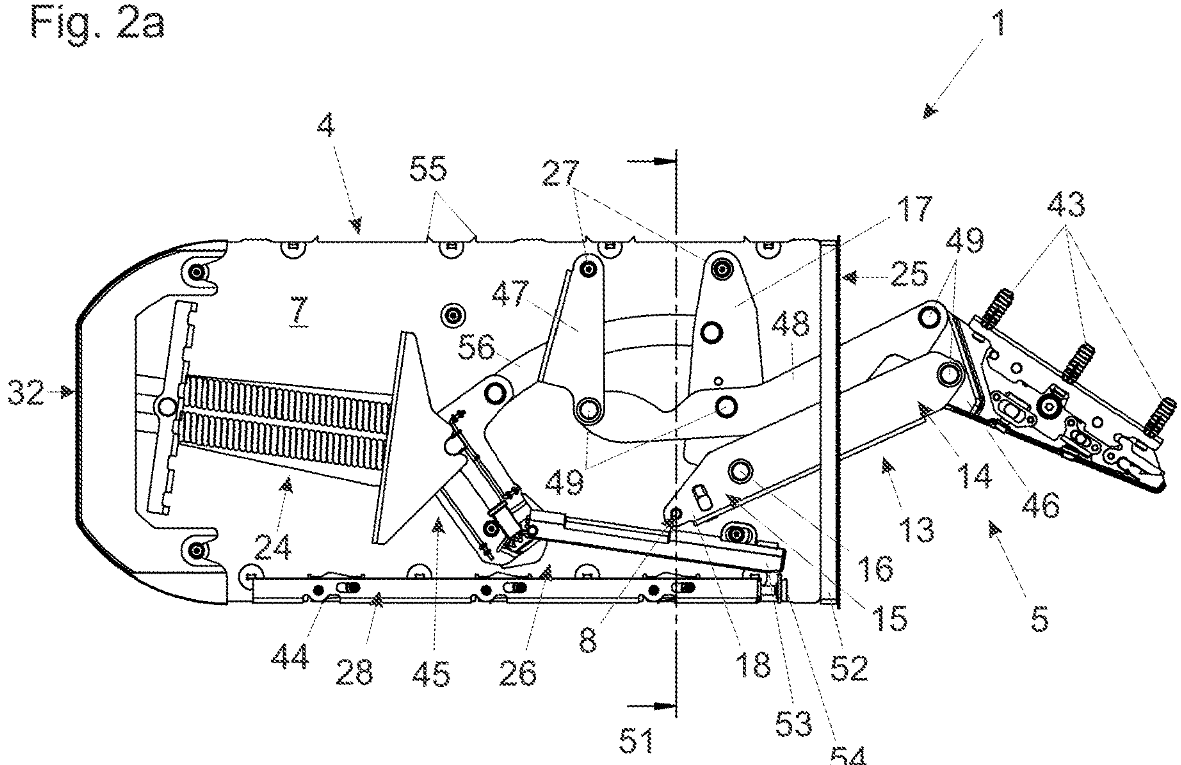
FIGS. 2*a*-2*c* show a furniture fitting according to a first preferred embodiment, wherein partial
Figure 2B:
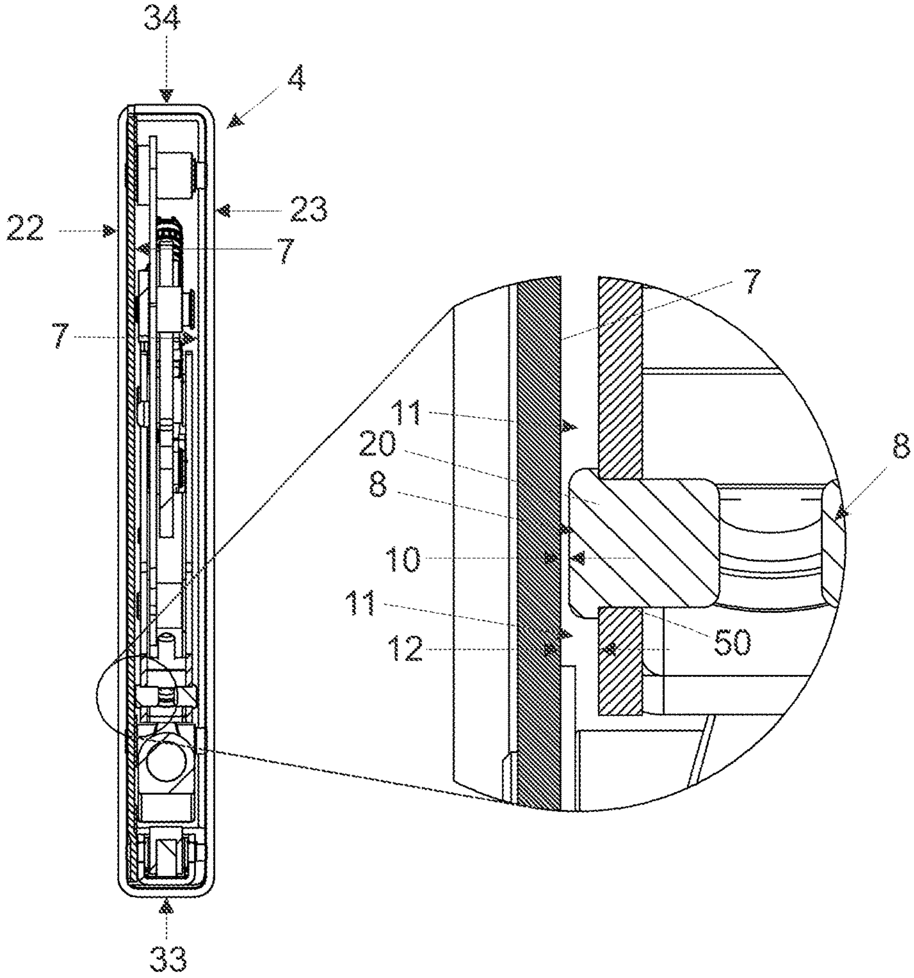
Figure 2C:
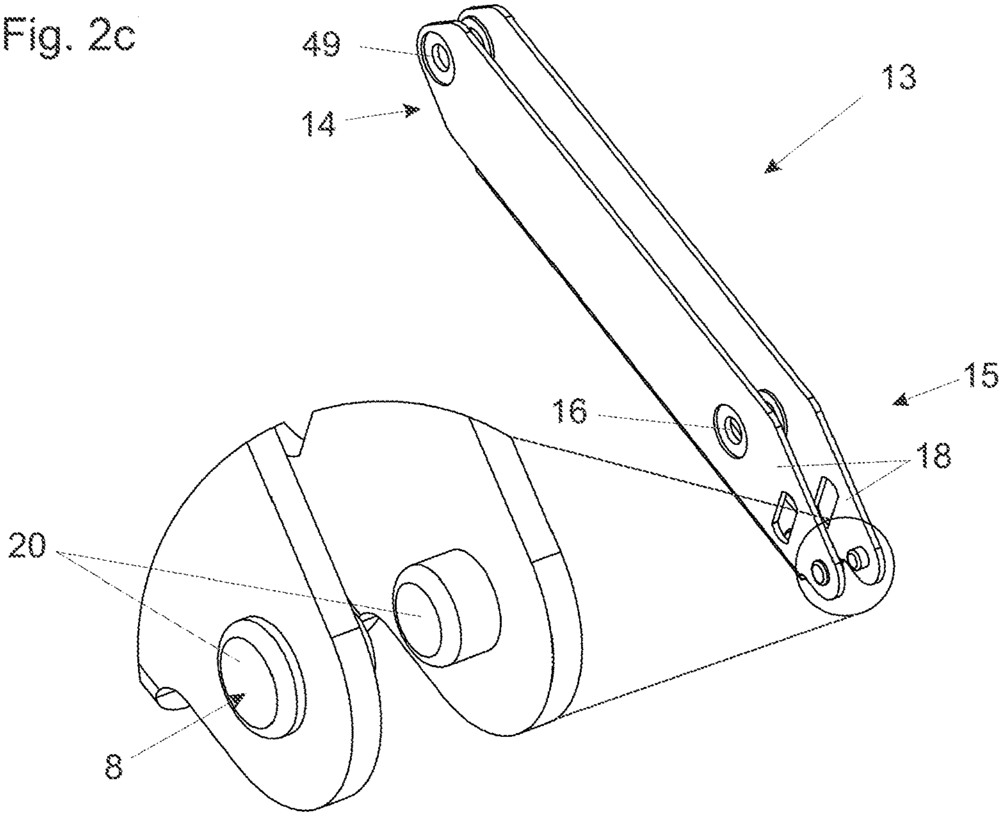

FIGS. 2*a* through 2*c* show a furniture fitting 1 according to a first preferred embodiment, wherein the furniture fitting 1 is designed for movement of a moveable furniture part 2 relative to a furniture carcass 3.

The furniture fitting 1 has a housing 4 which can be connected to the furniture carcass 3 and an actuating mechanism 5 which is or can be arranged at least partially within the housing 4 and which can be connected to the moveable furniture part 2. A fastener 43, for example in the form of dowels, can be provided for that purpose.

The actuating mechanism 5 and thus a furniture part 2 connected to the actuating mechanism are pivotable about at least one axis of rotation 6.

According to the first preferred embodiment the actuating mechanism 5 has local raised portions 8, by which, at least in a relative position of the actuating mechanism 5 with respect to the housing 4, a clearance 10 between the actuating mechanism 5 and an inner side 7 of the housing 4 facing towards the actuating mechanism 5, is at least halved in a direction parallel to the at least one axis of rotation 6, in comparison with a respective region 11 surrounding the local raised portions 8 (in other words, the size of the clearance 10 at the local raised portions 8 is no more than half the size of the clearance 12 in the region 11 surrounding the local raised portions 8).

In the illustrated case, even in any relative position of the actuating mechanism 5 with respect to the housing 4, a clearance 10 between the actuating mechanism 5 and the inner sides 7 of the housing 4 facing towards the actuating mechanism 5, is at least halved by the local raised portions 8 in comparison with a respective region 11 surrounding the local raised portions 8 in a direction parallel to at least one axis of rotation 6.

In absolute numbers, the clearance 10 between the actuating mechanism 5 and the inner sides 7 of the housing 4 facing towards the actuating mechanism 5 at the local raised portions 8 is 0.05 mm to 0.20 mm in the direction parallel to the at least one axis of rotation 6. Furthermore, the clearance 12 between the actuating mechanism 5 and the inner sides 7 of the housing 4, that face towards the actuating mechanism 5, is 0.80 mm to 2.00 mm in the direction parallel to the at least one axis of rotation 6 in the regions surrounding the local raised portions 8 (see FIG. 2*b*).

The actuating mechanism 5 includes an articulated lever 13 at which the local raised portions 8 are arranged (see in particular FIG. 2*c*), wherein the articulated lever 13 has a first end 14 which is moveable out of the housing 4 and a second end 15 which is opposite to the first end 14 and which is arranged within the housing 4, and wherein the local raised portions 8 are arranged at the second end 15 of the articulated lever 13.

The articulated lever 13 is connected to a further articulated lever 17 by way of a hinge axis 16, wherein the local raised portions 8 are arranged on a prolongation 18 of the articulated lever 13, that extends beyond the hinge axis 16.

There are provided further articulated levers 46, 47, 48 and further hinge axes 49. Overall the actuating mechanism 5 is in the form of a 7-rotary joint mechanism and is rotatably connected to the housing 4 by way of an axis 27 which is fixed with respect to the housing, wherein all provided axes 27 which are fixed with respect to the housing are formed separately from the local raised portions 8.

In the illustrated embodiment the local raised portions 8 are in the form of an additional part 20 of plastic. The articulated lever 13 has openings 50, in which the additional part 20 is portion-wise disposed.

The housing 4 has a first side 22 and a second side 23 which is opposite to the first side 22, wherein the two sides 22, 23 of the housing 4 are mutually spaced in a direction parallel to the at least one axis of rotation 6 and wherein a first local raised portion 8 is arranged in the region of the first side 22 of the housing 4 and a second local raised portion 8 is arranged in the region of the second side 23 of the housing 4 (see in particular FIG. 2*b*).

The housing 4, except for rounded corners at a rear side 32, substantially is of a cuboidal configuration. Besides the rear side 32 and the sides 22 and 23 the housing also has a top side 34, an underside 33 and an end 25. The actuating mechanism 5 passes through the end 25.

As in the illustrated case a flange 52 for covering a milled edge of the recess 29 can be arranged at the end 25 of the housing 4.

There is provided a fixing device 28 which is actuable from the end 25 of the housing 4 of the furniture fitting 1 for fixing the housing 4 of the furniture fitting 1 in a recess 29 of the furniture carcass 3.

As in the illustrated case the fixing device 28 can include an actuating element 54 actuable for example by a screwdriver. A carrier 57 is displaceable relative to the housing 4 by way of the actuating element 54, wherein mounted pivotably to the carrier 57 are fixing elements 44 which are moveable by the movement of the carrier 57 into and/or to the material of the recess 29.

Besides the fixing device 28 at the underside 33 of the housing 4, it is also possible to provide fixing elements 55 at the top side 34, for example in the form of claws.

The actuating mechanism 5 includes a spring force storage mechanism 24 for applying force to the at least one furniture part 2 which can be connected to the actuating mechanism 5, wherein there is provided an adjusting device 26 actuable from the end 25 of the housing 4 of the furniture fitting 1 for adjusting a spring prestressing of the spring force storage mechanism 24. For that purpose, as in the illustrated case, the adjusting device 26 can have an adjusting element 53 actuable for example by a screwdriver.

The spring force storage mechanism 24 cooperates with the actuating mechanism 5 by way of a force transmission mechanism 45 and a force transmission lever 56.

Figure 3:
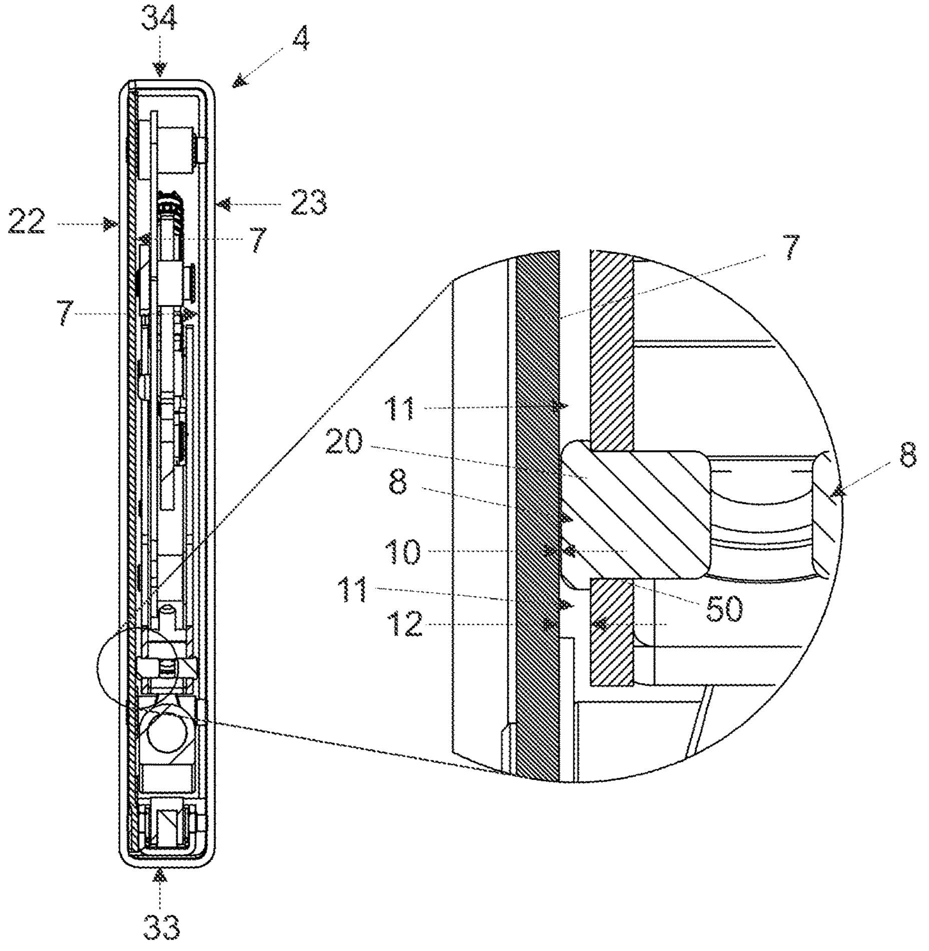
FIG. 3 shows the furniture fitting according to the first preferred embodiment in a loaded state, wherein the furniture fitting is illustrated in a diagrammatic cross-sectional view along cross-sectional plane 51.

FIG. 3 shows the furniture fitting 1 according to the first preferred embodiment in a loaded state.

As a comparison with FIG. 2*b* shows, a method of load-dependent stabilization of a furniture part 2 mounted moveably to a furniture carcass 3 by way of the furniture fitting 1 can be implemented as follows:

In a non-loaded state in which substantially only a weight force 35 (see FIG. 1*a*) and a spring force of the spring force storage mechanism 24 are acting on the furniture part 2 there is clearance 10 at the local raised portions 8 between the actuating mechanism 5 and the inner sides 7 of the housing 4, that face towards the actuating mechanism 5, in a direction parallel to the at least one axis of rotation 6 of the actuating mechanism 5. In a state in which the moveable furniture part 2 is loaded by an additional force 36 acting at least in the direction parallel to the at least one axis of rotation 6, that clearance 10 is reduced to zero so that a contact occurs between the actuating mechanism 5 and at least one of the inner sides 7 of the housing 4, that face towards the actuating mechanism 5, at least at one of the local raised portions 8.

Figure 4A:
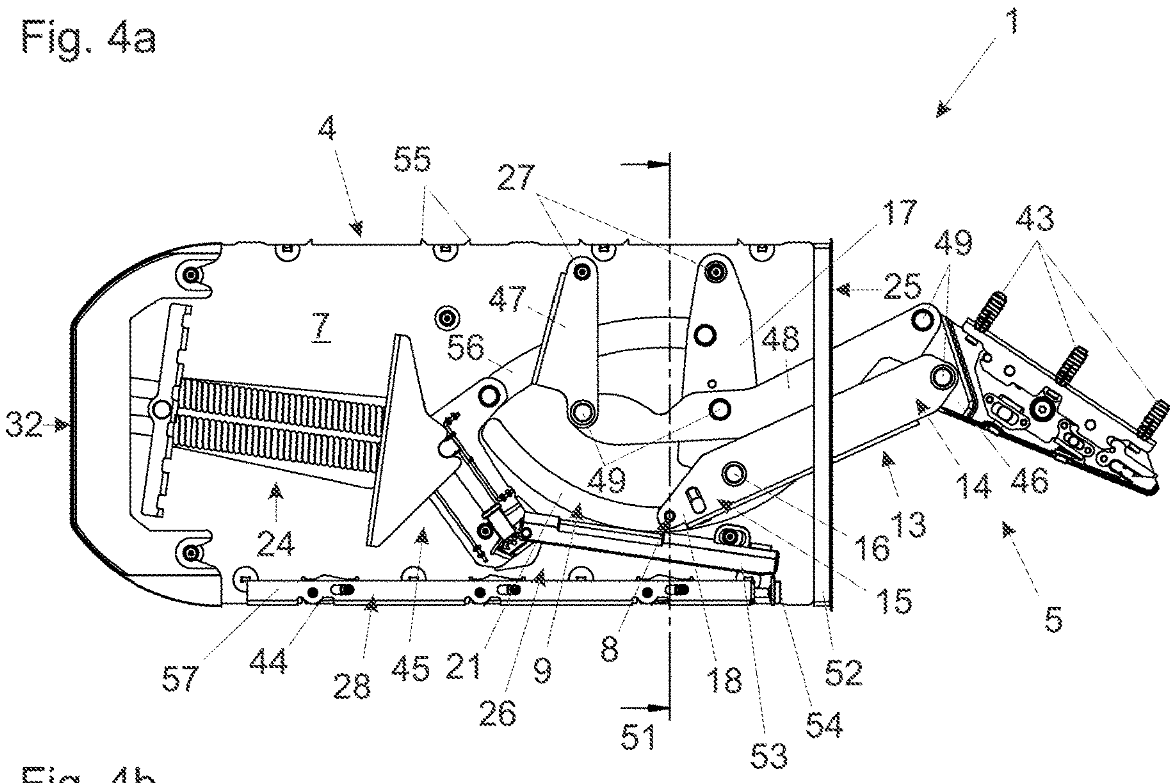
FIGS. 4*a*-4*c* show a furniture fitting according to a second preferred embodiment, wherein partial
Figure 4B:
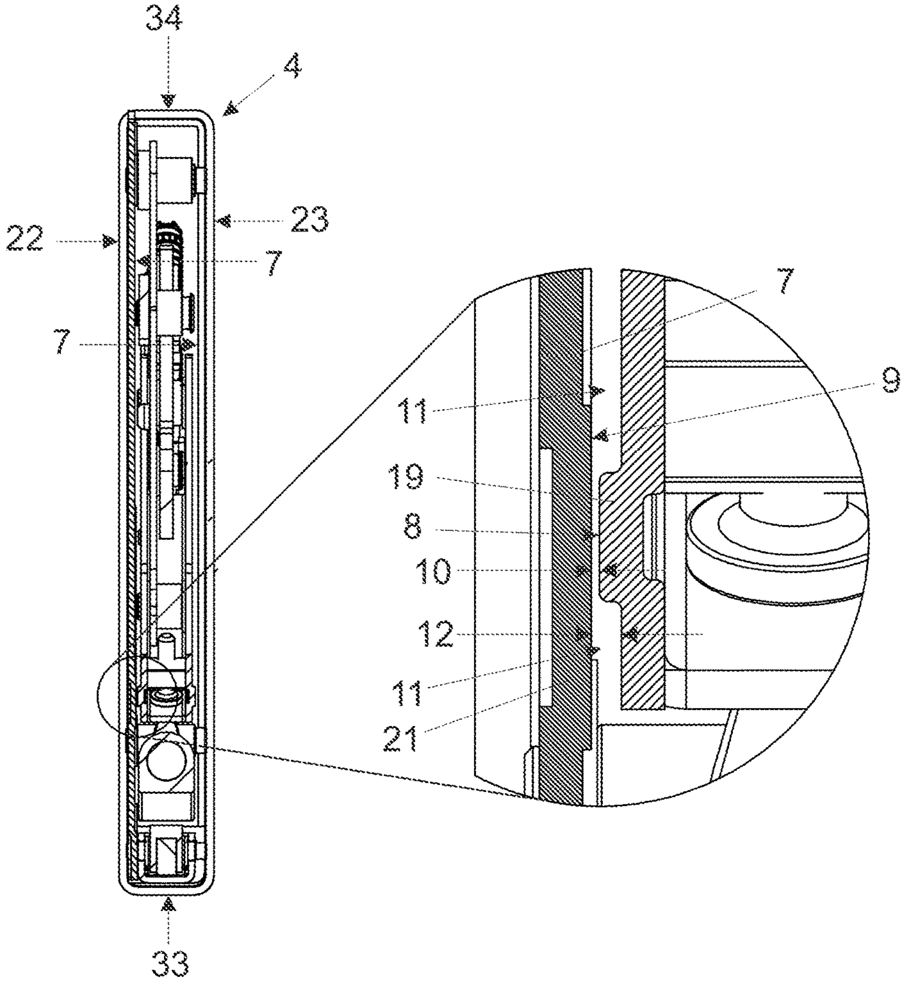
Figure 4C:
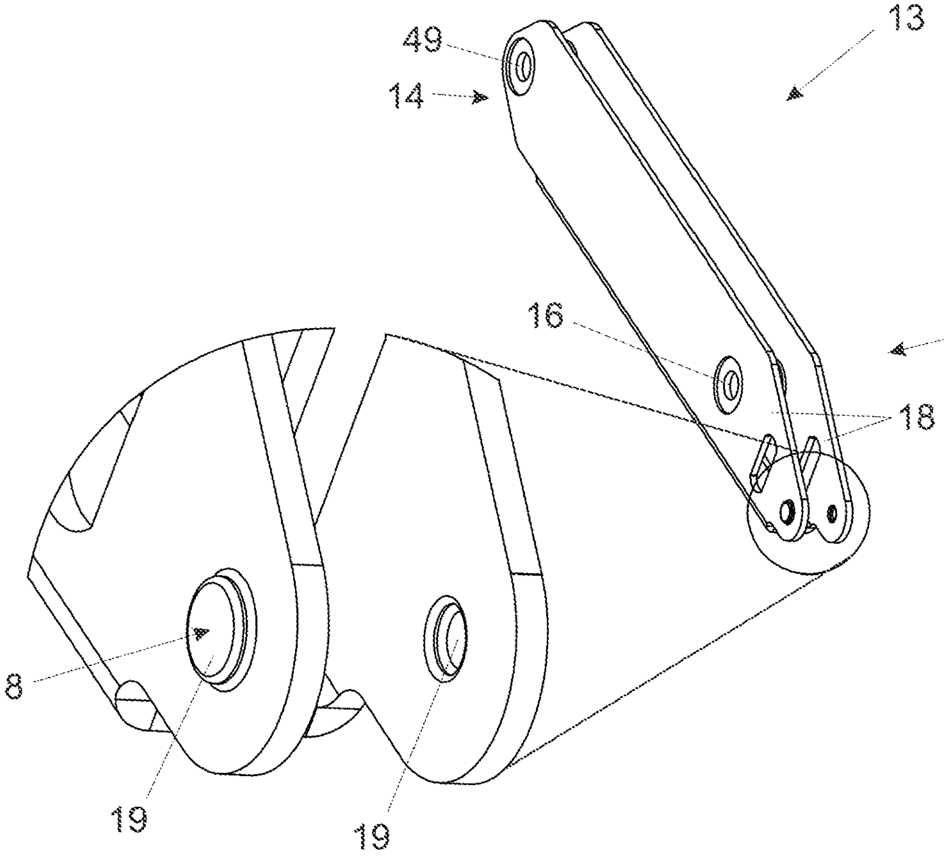

FIGS. 4*a* through 4*c* show a furniture fitting 1 according to a second preferred embodiment, wherein the furniture fitting 1 according to this second preferred embodiment differs from the furniture fitting 1 according to the first preferred embodiment in that local raised portions 8, 9 are arranged both at the inner sides 7 of the housing 4 and also at the actuating mechanism 5.

In the present case the local raised portions 8, 9 are in the form of outwardly shaped portions 19, 21 and are in opposite relationship.

The local raised portions 9 are respectively arranged in the form of a curved outwardly shaped portion 21 at an inner side 7 of the housing 4, that faces towards the actuating mechanism 5.

Figure 5:
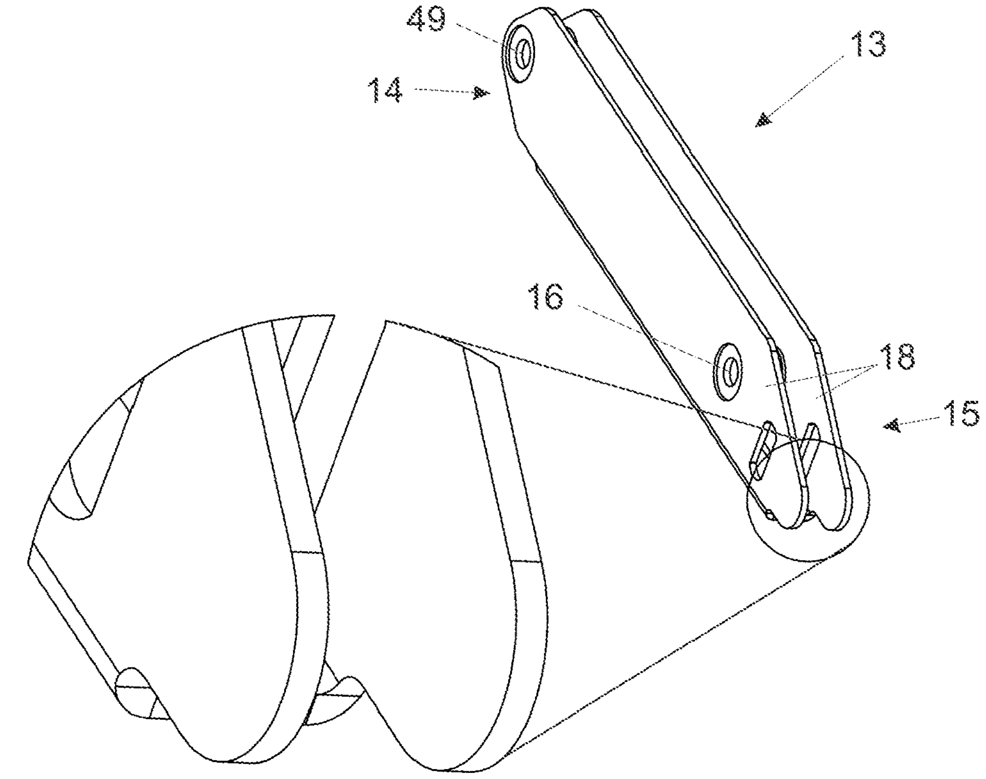
FIG. 5 shows an articulated lever of a furniture fitting according to a third preferred embodiment, wherein the articulated lever is shown in a diagrammatically illustrated perspective view.

According to a third preferred embodiment, local raised portions 9 are arranged only at the inner sides 7 of the housing 4, but not at the actuating mechanism 5. FIG. 5 shows an articulated lever 13 of a furniture fitting 1 according to such a third embodiment.

The invention claimed is:

1. A furniture fitting for moving a moveable furniture part relative to a furniture carcass, the furniture fitting comprising:

a housing to be connected to the furniture carcass, and an actuating mechanism to be arranged at least partially within the housing and to be connected to the moveable furniture part, wherein the actuating mechanism is pivotable about an axis of rotation, wherein the actuating mechanism and/or an inner side of the housing facing towards the actuating mechanism has a local raised portion such that, at least in a relative position of the actuating mechanism with respect to the housing, a clearance between the actuating mechanism and the inner side of the housing facing towards the actuating mechanism in a direction parallel to the axis of rotation at the local raised portion is no more than half of a clearance between the actuating mechanism and the inner side of the housing facing towards the actuating mechanism in a region surrounding the local raised portion, and wherein the clearance between the actuating mechanism and the inner side of the housing facing towards the actuating mechanism is 0.05 mm to 0.20 mm at the local raised portion in the direction parallel to the axis of rotation.

2. The furniture fitting as set forth in claim 1, wherein the clearance between the actuating mechanism and the inner side of the housing facing towards the actuating mechanism in the direction parallel to the axis of rotation is no more than half of the clearance between the actuating mechanism and the inner side of the housing facing towards the actuating mechanism in the region surrounding the local raised portion by the local raised portion at least in the relative position of the actuating mechanism with respect to the housing corresponding to a complete open position of the furniture part to be connected to the actuating mechanism.

3. The furniture fitting as set forth in claim 1, wherein the clearance between the actuating mechanism and the inner side of the housing facing towards the actuating mechanism in the direction parallel to the axis of rotation is no more than half of the clearance between the actuating mechanism and the inner side of the housing facing towards the actuating mechanism in the region surrounding the local raised portion by the local raised portion in any relative position of the actuating mechanism with respect to the housing.

4. The furniture fitting as set forth in claim 1, wherein the clearance between the actuating mechanism and the inner side of the housing facing towards the actuating mechanism is no more than one-fifth of the clearance between the actuating mechanism and the inner side of the housing facing towards the actuating mechanism in the region surrounding the at least one local raised portion.

5. The furniture fitting as set forth in claim 1, wherein the clearance between the actuating mechanism and the inner side of the housing facing towards the actuating mechanism in the direction parallel to the axis of rotation is 0.80 mm to 2.00 mm in the region surrounding the local raised portion.

6. The furniture fitting as set forth in claim 1, wherein the actuating mechanism includes an articulated lever at which the local raised portion is arranged.

7. The furniture fitting as set forth in claim 6, wherein the articulated lever is a first articulated lever connected to a second articulated lever by a joint axis.

8. The furniture fitting as set forth in claim 1, wherein the local raised portion is an outwardly shaped portion and/or an additional plastic part.

9. The furniture fitting as set forth in claim 1, wherein the local raised portion is a curved outwardly shaped portion at the inner side of the housing facing towards the actuating mechanism.

10. The furniture fitting as set forth in claim 1, wherein the housing has a first side and a second side opposite the first side, wherein the first side and the second side of the housing are spaced from each other in a direction parallel to the axis of rotation.

11. The furniture fitting as set forth in claim 1, wherein the housing has a substantially cuboidal configuration.

12. The furniture fitting as set forth in claim 1, wherein the actuating mechanism includes a spring force storage mechanism for applying force to the furniture part to be connected to the actuating mechanism.

13. The furniture fitting as set forth in claim 1, wherein the actuating mechanism is a 7-rotary joint mechanism and/or is rotatably connected to the housing by an axis fixed with respect to the housing, wherein all axes fixed with respect to the housing are formed separately from the local raised portion.

14. The furniture fitting as set forth in claim 1, further comprising a fixing device actuable from an end of the housing of the furniture fitting for fixing the housing of the furniture fitting in a recess of the furniture carcass.

15. An article of furniture comprising:

a furniture carcass, and a furniture part mounted moveably to the furniture carcass by the furniture fitting as set forth in claim 1, wherein the furniture part is a furniture door or a furniture flap and/or the furniture part is pivotable about a substantially horizontal axis of rotation.

16. The article of furniture as set forth in claim 15, wherein the furniture carcass includes a side wall and a recess arranged in the side wall, and the housing of the furniture fitting is arranged at least partially in the recess.

17. The furniture fitting as set forth in claim 6, wherein the articulated lever has a first end moveable out of the housing, and a second end opposite to the first end and arranged within the housing at least in the relative position of the actuating mechanism, and the local raised portion is arranged at the second end of the articulated lever.

18. The furniture fitting as set forth in claim 7, wherein the local raised portion is arranged at a prolongation of the articulated lever extending beyond the joint axis.

19. The furniture fitting as set forth in claim 10, wherein the local raised portion is a first local raised portion arranged in a region of the first side of the housing, and a second local raised portion is arranged in a region of the second side of the housing.

20. The furniture fitting as set forth in claim 12, further comprising an adjusting device for adjusting a spring prestressing of the spring force storage mechanism, the adjusting device being actuable from an end of the housing of the furniture fitting.

21. The article of furniture as set forth in claim 16, wherein the housing is arranged completely in the recess, and the recess and/or the housing has a substantially cuboidal configuration, and the housing is covered on at least four sides by a material of the side wall.

* * * * *